US012695297B2

(12) United States Patent
Chen et al.

(10) Patent No.: US 12,695,297 B2
(45) Date of Patent: Jul. 28, 2026

(54) SURGE PROTECTION MODULE AND SURGE PROTECTION DEVICE

(71) Applicant: Shanghai Chenzhu Instrument Co., Ltd., Shanghai (CN)

(72) Inventors: Keqi Chen, Shanghai (CN); Zhenhui Liu, Shanghai (CN)

(73) Assignee: SHANGHAI CHENZHU INSTRUMENT CO., LTD., Shanghai (CN)

( * ) Notice: Subject to any disclaimer, the term of this patent is extended or adjusted under 35 U.S.C. 154(b) by 140 days.

(21) Appl. No.: 18/288,981

(22) PCT Filed: Apr. 30, 2021

(86) PCT No.: PCT/CN2021/091298
§ 371 (c)(1),
(2) Date: Oct. 30, 2023

(87) PCT Pub. No.: WO2022/226958
PCT Pub. Date: Nov. 3, 2022

(65) Prior Publication Data
US 2024/0222962 A1 Jul. 4, 2024

(51) Int. Cl.
H02H 9/04 (2006.01)
(52) U.S. Cl.
CPC .................................. H02H 9/044 (2013.01)
(58) Field of Classification Search
CPC ........ H01H 71/04; H01H 85/306; H01H 9/32; H01H 71/465; H01H 37/08; H01H 2037/762; H01H 37/761; H02H 9/04
(Continued)

(56) References Cited

U.S. PATENT DOCUMENTS 10,121,615 B1 * 11/2018 Wu ........................ H01H 71/02
11,735,890 B2 * 8/2023 Strangfeld ................ H01T 1/14
361/118
(Continued)

FOREIGN PATENT DOCUMENTS

CN 101752856 A * 6/2010
CN 201515206 U 6/2010
(Continued)

OTHER PUBLICATIONS

Li, Tian-mi; CN-212304744; Surge Protector, entire specification and drawings (Year: 2021).*
(Continued)

*Primary Examiner* — Dharti H Patel

(57) ABSTRACT

A surge protection module (1) and a surge protection device. The surge protection module (1) comprises: a bearing frame (12), a mounting plate (121) of which is provided with an electrode via hole (1211); a pressure-sensitive resistor (13) having a first electrode (131) and a second electrode (132) on the first side of the mounting plate (121); an electrode connector (14) mounted on the second side of the mounting plate (121), one end of the electrode connector (14) being welded to the second electrode (132) by means of the electrode via hole (1211); and a tripping mechanism comprising a rotating body (15) and a potential storage spring (16), wherein the rotating body (15) is provided with an arc-isolating plate (154), when the electrode connector (14) and the second electrode (132) are in a welding state, the rotating body (15) is limited in the first position, and the arc-isolating plate (154) is located on the side of the rotating body (15) facing the electrode via hole (1211) and corresponds to the electrode via hole (1211); and when a solder between the electrode connector (14) and the second electrode (132) melts, the potential storage spring (16) drives the rotating body (15) to rotate, and the arc-isolating plate (154)
(Continued)

rotates to the electrode via hole (1211) and between the electrode connector (14) and the second electrode (132). The surge protection module (1) and the surge protection device can effectively avoid the problem of solder adhesion and possibly arcing during tripping.

8 Claims, 10 Drawing Sheets

(58) Field of Classification Search
USPC ........................................................ 361/118
See application file for complete search history.

(56) References Cited

U.S. PATENT DOCUMENTS

| | | | |
|---|---|---|---|
| 2006/0044729 A1* | 3/2006 | Domejean .............. | H02H 9/042 |
| | | | 361/118 |
| 2016/0148728 A1 | 5/2016 | Doser et al. | |
| 2018/0374666 A1* | 12/2018 | Zhai et al. ............... | H01C 7/12 |
| 2021/0126447 A1* | 4/2021 | Miller .................... | H01H 71/58 |

FOREIGN PATENT DOCUMENTS

| | | | | | |
|---|---|---|---|---|---|
| CN | 206819955 U | * | 12/2017 | | |
| CN | 108364836 A | * | 8/2018 | .............. | H02H 9/04 |
| CN | 108878086 A | * | 11/2018 | ............. | H01H 37/08 |
| CN | 209344757 U | | 9/2019 | | |
| CN | 210430922 U | | 4/2020 | | |
| CN | 111933370 A | * | 11/2020 | .............. | H01C 1/02 |
| CN | 112259312 A | | 1/2021 | | |
| CN | 212304744 U | * | 1/2021 | | |
| DE | 102020107318 B4 | * | 6/2023 | .............. | H01H 9/32 |

OTHER PUBLICATIONS

Tang Bingzhao; CN 210430922; Surge protection device; entire specification and drawings. (Year: 2020).*

International Application Serial No. PCT/US2021/091298, International Search Report mailed Jan. 26, 2022, W/English Translation, 6 pgs.

International Application Serial No. PCT/US2021/091298, Written Opinion mailed Jan. 26, 2022, W/O English Translation, 3 pgs.

* cited by examiner

SURGE PROTECTION MODULE AND SURGE PROTECTION DEVICE

This application is a U.S. National Stage Filing under 35 U.S.C. 371 from International Application No. PCT/CN2021/091298, filed on Jun. 30, 2021, and published as WO 2022/226958 A1 on Nov. 3, 2022, which is incorporated by reference herein in its entirety.

TECHNICAL FIELD

The present disclosure relates to the technical field of overvoltage and overcurrent protection, in particular to a surge protection module and a surge protection device.

BACKGROUND

Lightning is one of the ten natural disasters. With the advancement of technology, devices are becoming increasingly intelligent and integrated, making them more sensitive to transient overvoltage—surges caused by lightning. In addition, the startup and shutdown of high-power devices may also generate surges. Surge protectors (or surge protection devices) can avoid damage to the devices caused by the surges, and are widely applied to industries such as communication, construction, rail transit, electric power, new energy and petrochemical engineering. When peak currents or voltages are generated in electrical loop lines due to lightning strikes or external interference, the surge protectors can conduct and discharge the currents in a very short period of time, limiting the voltage to a low level, thereby avoiding damage to other devices in the loop caused by the surges.

In the surge protectors for power distribution systems, a commonly used element is a pressure-sensitive resistor. The pressure-sensitive resistor has a very large resistance under a normal working condition, equivalent to an open-circuit state. When the voltage in a circuit exceeds a predetermined value, its resistance drops sharply, it is in a conductive state, which may discharge a large quantity of currents and limit an overvoltage level.

However, after using for a long time, the pressure-sensitive resistor may gradually age, the leakage current gradually increases, and thermal balance is destroyed, resulting in continuous increasing of the product temperature. In order to prevent fire accidents caused by overheating of the pressure-sensitive resistor, a thermal protection tripping device is usually arranged in a surge protector, and used for disconnecting the pressure-sensitive resistor from the circuit when the temperature increases, once the pressure-sensitive resistor is disconnected from the circuit, the surge protector will fail and lose its protective effect on the device. The failed surge protector is provided with a state indicator to prompt maintenance personnel to replace it timely. In some unmanned situations, it is also necessary to design a remote signaling device to achieve remote indication of a failure state of the surge protector.

At present, in an existing surge protector, an internal structure is complex, moreover, after disconnecting the pressure-sensitive resistor from the circuit, the thermal protection tripping device is also prone to solder adhesion problems and possibly arcing, thereby posing a certain risk.

SUMMARY

An objective of the present disclosure is to solve the problem of solder adhesion and arcing after tripping of an existing surge protector.

In order to achieve the above objective, the present disclosure provides a surge protection module, including:
- a bearing frame, including a mounting plate which is provided with an electrode via hole penetrating through both sides;
- a pressure-sensitive resistor, mounted on a first side of the mounting plate and having a first electrode and a second electrode, wherein the first electrode is provided with a first pin located at a bottom end of the bearing frame and used for plugging;
- an electrode connector, mounted on a second side of the mounting plate, wherein one end of the electrode connector is welded to the second electrode of the pressure-sensitive resistor through the electrode via hole, and the other end of the electrode connector is provided with a second pin located at the bottom end of the bearing frame and used for plugging; and
- a tripping mechanism, including a rotating body and a potential storage spring, wherein one end of the rotating body is rotatably mounted the second side of the mounting plate through a rotating shaft, and an arc-isolating plate is arranged at a position of the rotating body away from the rotating shaft; when the electrode connector and the second electrode are in a welding state, the rotating body is limited in a first position close to the bottom end of the bearing frame, the arc-isolating plate is located on one side of the rotating body facing the electrode via hole and corresponds to the electrode via hole, and the potential storage spring is arranged between the rotating body and the bearing frame and is in a compressed or stretched potential storage state; and
- when a solder between the electrode connector and the second electrode melts, the potential storage spring drives the rotating body to rotate to a second position in a direction away from the bottom end of the bearing frame through an elastic force, and at the second position, the arc-isolating plate rotates to the electrode via hole and between the electrode connector and the second electrode.

Preferably, the potential storage spring is located on one side of the rotating body facing away from the bottom end of the bearing frame, when the electrode connector and the second electrode are in the welding state, the potential storage spring is in a stretched state, and when the rotating body rotates in the direction away from the bottom end of the bearing frame, the potential storage spring retracts.

Preferably, a position between the rotating shaft and the arc-isolating plate is provided with an accommodating groove used for accommodating the potential storage spring, a first spring connection part is arranged on the bearing frame, and a second spring connection part is arranged at a position of the rotating body close to the accommodating groove; and
- one end of the potential storage spring is connected to the first spring connection part, the other end is connected to the second spring connection part, a part of the potential storage spring close to the second spring connection part is located in the accommodating groove, and the accommodating groove limits the potential storage spring to bend towards the rotating shaft.

Preferably, the surge protection module further includes a housing, and a state display hole is formed in a top end of the housing;

a first state indication part is arranged on the bearing frame, and when the rotating body is located at the first position, the state display hole displays the first state indication part; and a second state indication part is arranged on the rotating body, and when the rotating body rotates to the second position, the state display hole displays the second state indication part.

Preferably, the second state indication part is arranged on an outer side of the arc-isolating plate in a radial direction, and the second state indication part extends out of the arc-isolating plate along an arc to form an arc strip bent towards the rotating shaft; and a gap exists between the first state indication part and the state display hole, and when the rotating body rotates to the second position, the second state indication part rotates to enter the gap and corresponds to the state display hole.

Preferably, the arc-isolating plate has an inner arc edge bent towards the rotating shaft and an outer arc edge away from the rotating shaft compared to the inner arc edge.

Preferably, an arc limiting groove is formed in the rotating body, the electrode connector includes an arc part located in the arc limiting groove, and in a rotation process of the rotating body, the arc part moves relative to the rotating body along the arc limiting groove; and two side edges of the arc limiting groove are formed by extending from the inner arc edge and the outer arc edge of the arc-isolating plate respectively.

Preferably, a boss protruding towards the electrode via hole is formed on the second electrode of the pressure-sensitive resistor, one end of the electrode connector welded to the pressure-sensitive resistor is a sheet-like body, and the sheet-like body is attached and welded to a surface of the boss through the electrode via hole.

According to another aspect of the present disclosure, a surge protection device is further provided, and includes a base and the surge protection module, mounted on the base, as mentioned above;

the base is provided with bayonet sockets corresponding to a first pin and a second pin respectively and used for being electrically connected with lines, and the first pin and the second pin of the surge protection module are correspondingly plugged into the bayonet sockets; and the base is further provided with a remote signaling mechanism, which is arranged to be linked with a tripping mechanism, when a rotating body is located at a first position, the remote signaling mechanism indicates a first state signal, and when the rotating body is located at a second position, the remote signaling mechanism indicates a second state signal.

In the technical solution provided by the present disclosure, the tripping mechanism effectively blocks the possible arc between the electrode of the pressure-sensitive resistor and the electrode connector, avoiding the possible problem of solder adhesion, and tripping is complete. Moreover, the tripping mechanism provided by the present disclosure has a simple and compact structure, which is not only conducive to reducing a volume of the surge protection module, but also conducive to shortening a production cycle.

Other features and advantages of the present disclosure will be described in detail in the subsequent specific implementations.

BRIEF DESCRIPTION OF FIGURES

Accompanying drawings constituting a part of the present disclosure are used for providing a further understanding of the present disclosure, and schematic implementations of the present disclosure and description thereof are used for explaining the present disclosure, and do not constitute an improper limitation on the present disclosure. In the figures.

DESCRIPTION OF REFERENCE NUMERALS

Figure 1:
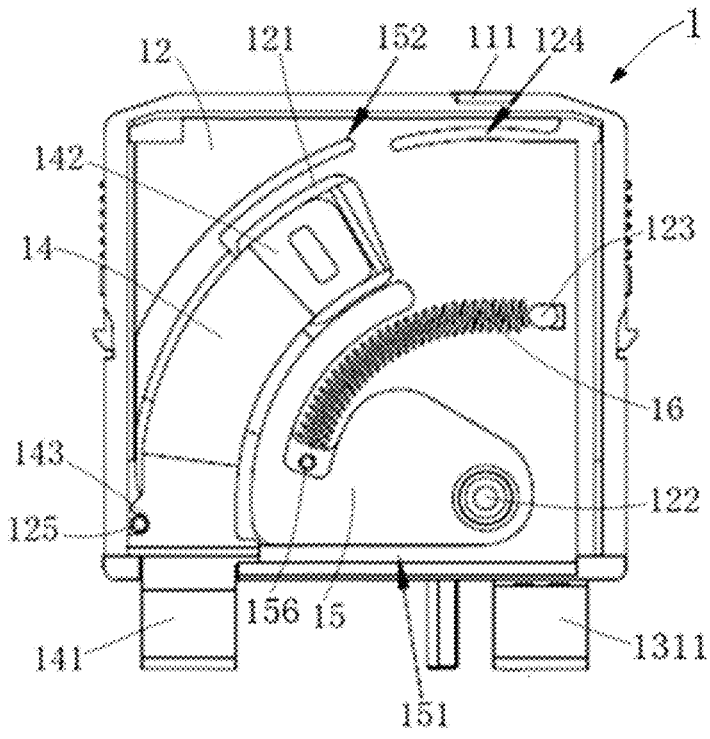
FIG. 1 is a schematic structural diagram of a surge protection module in one implementation according to the present disclosure (with a rotating body in a tripping mechanism being in a first position).

1—surge protection module; 11—housing; 111—state display hole; 112—buckle; 12—bearing frame; 121—mounting plate; 1211—electrode via hole; 122—rotating shaft; 123—first spring connection part; 124—first state indication part; 125—positioning column; 126—via hole; 127—first supporting part; 128—second supporting part; 129—error-proofing pin; 13—pressure-sensitive resistor; 131—first electrode; 1311—first pin; 132—second electrode; 1321—boss; 14—electrode connector; 141—second pin; 1411—slot; 142—welding end; 143—positioning groove; 15—rotating body; 151—limiting surface; 152—second state indication part; 153—rotating shaft mounting hole; 154—arc-isolating plate; 1541—inner arc edge; 1542—outer arc edge; 155—accommodating groove; 156—second spring connection part; 157—arc strip; 16—potential storage spring; 2—base; 21—upper cover; 211—open hole; 212—wiring hole; 213—error-proofing jack; 22—mounting main body; 23—microswitch; 24—linkage swing rod; 241—touching part; 242—force bearing part; 243—rotating shaft; 25—transmission piece; 251—intermediate part; 252—first column body; 253—second column body; 26—spring; 27—first wiring plate; 28—second wiring plate; 29—crimping frame; 3—remote signaling terminal seat; and 4—remote signaling connection terminal.

DETAILED DESCRIPTION

Example implementations will be described more comprehensively with reference to accompanying drawings. However, the example implementations can be implemented in a variety of forms and should not be construed as limited to examples set forth herein; and on the contrary, providing these implementations makes the present disclosure more comprehensive and complete, and comprehensively conveys the concept of the example implementations to those skilled in the art. The accompanying drawings are only schematic diagrams of the present disclosure and are not necessarily drawn to scale. In the figures, the same reference numerals represent the same or similar parts, so their repeated description will be omitted.

In addition, the described features, structures or characteristics may be combined in one or more implementations in any suitable manner. In the following description, many specific details are provided to give a full understanding of the implementations of the present disclosure. However, those skilled in the art will realize that the technical solution of the present disclosure may be practiced with omitting one or more of the specific details, or other methods, components, devices, steps and the like may be adopted. In other cases, well-known structures, methods, devices, implementations, materials or operations are not shown or described in details, so as to avoid a situation that various aspects of the present disclosure become blurred due to a reversal of the order of host and guest.

For ease of description, spatial relative terms such as "up", "down", "left", and "right" may be used here to describe a relationship between one element or feature shown in the figures and another element or feature. It should be understood that in addition to the orientation shown in the figure, the spatial terms mean to include different orientations of the device in use or operations. For example, if the device in the figure is inverted, an element described as located "below" other elements or features will be positioned "above" other elements or features. Therefore, the exemplary term "lower" may contain both up and down orientations. The device may further be positioned in other ways, such as rotating by 90 degrees or in other orientations, and the spatial relative description used here may be explained accordingly.

Figure 2:
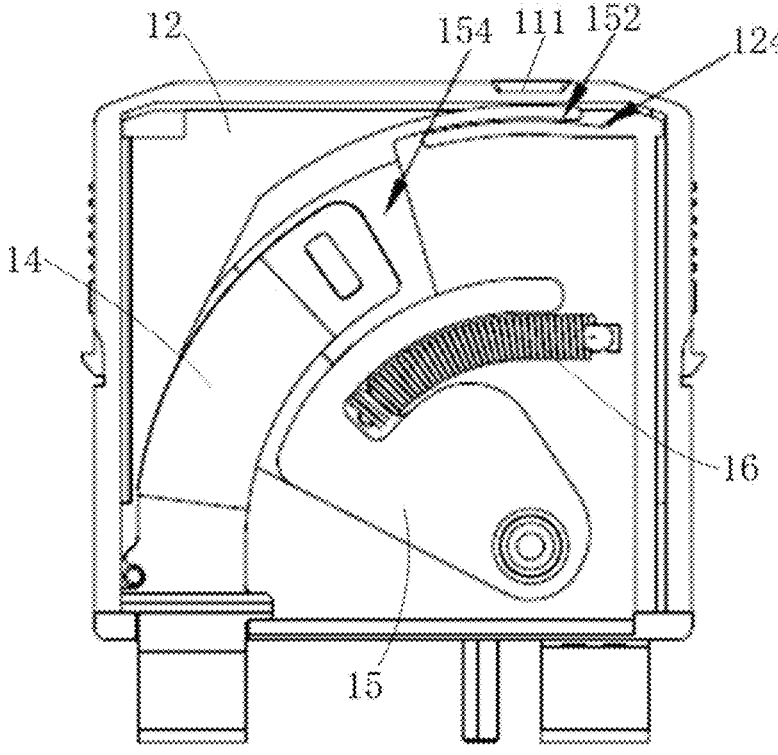
FIG. 2 is another schematic structural diagram of a surge protection module (with a rotating body in a tripping mechanism being in a second position).

The present disclosure provides a surge protection module, as shown in FIG. 1 and FIG. 2, the surge protection module 1 includes:

a bearing frame 12, including a mounting plate 121 which is provided with an electrode via hole 1211 penetrating through both sides;

a pressure-sensitive resistor 13, mounted on a first side of the mounting plate 121 and having a first electrode 131 and a second electrode 132, wherein the first electrode 131 is provided with a first pin 1311 located at a bottom end of the bearing frame 12 and used for plugging;

an electrode connector 14, mounted on a second side of the mounting plate 121, wherein one end of the electrode connector 14 is welded to the second electrode 132 of the pressure-sensitive resistor 13 through the electrode via hole 1211, and the other end of the

Figure 5:
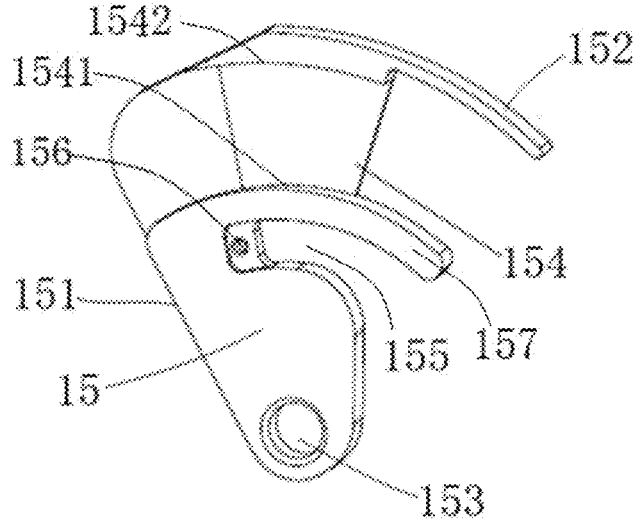
FIG. 5 is a schematic structural diagram of a rotating body.

6 electrode connector 14 is provided with a second pin 141 located at the bottom end of the bearing frame 12 and used for plugging; and a tripping mechanism, including a rotating body 15 and a potential storage spring 16, wherein one end of the rotating body 15 is rotatably mounted on the second side of the mounting plate 121 through a rotating shaft 122, and an arc-isolating plate 154 is arranged at a position of the rotating body 15 away from the rotating shaft 122, referring to FIG. 5. When the electrode connector 14 and the second electrode 132 are in a welding state, the rotating body 15 is limited in a first position close to the bottom end of the bearing frame 12, the arc-isolating plate 154 is located on one side of the rotating body 15 facing the electrode via hole 1211 and arranged corresponding to the electrode via hole 1211, and the potential storage spring 16 is arranged between the rotating body 15 and the bearing frame 12 and is in a compressed or stretched potential storage state; and when a solder between the electrode connector 14 and the second electrode 132 melts, the potential storage spring 16 drives the rotating body 15 to rotate to a second position in a direction away from the bottom end of the bearing frame 12 through an elastic force, and at the second position, the arc-isolating plate 154 rotates to the electrode via hole 1211 and between the electrode connector 14 and the second electrode 132.

In the technical solution provided by the present disclosure, when a temperature increases, the welding between the electrode connector 14 and the electrode of the pressure-sensitive resistor 13 is subjected to disconnection, the tripping mechanism can effectively block a possible arc between the second electrode 132 of the pressure-sensitive resistor and the electrode connector 14 through the arc-isolating plate 154 arranged on the rotating body 15, avoiding the possible problem of solder adhesion, and tripping is complete. Moreover, in the arrangement mode of the rotating body 15 in the present disclosure, it may rotate at a small angle during tripping to block the arc, which may effectively increase an electrical distance between the second electrode 132 and the electrode connector 14.

The tripping mechanism provided by the present disclosure has a simple and compact structure, which is not only conducive to reducing a volume of the surge protection module, but also conducive to shortening a production cycle.

The surge protection module provided by the present disclosure is described in details according to one specific implementation below.

Figure 3:
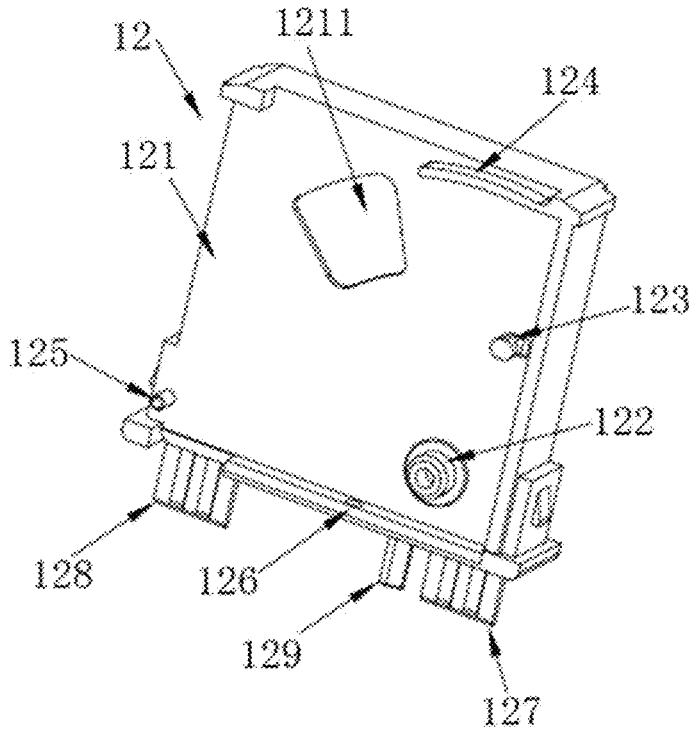
FIG. 3 is a schematic structural diagram of a bearing frame viewed from one side.
Figure 4:
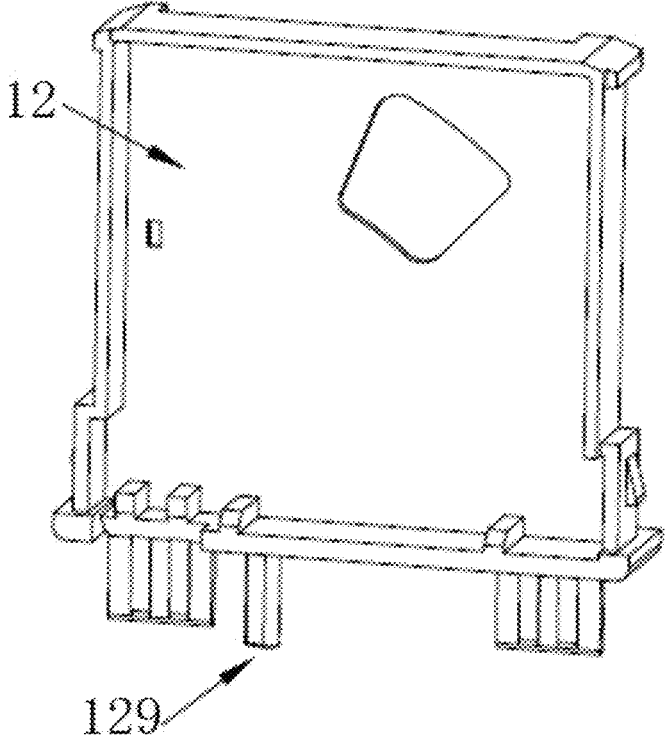
FIG. 4 is a schematic structural diagram of a bearing frame viewed from the other side.
Figure 6:
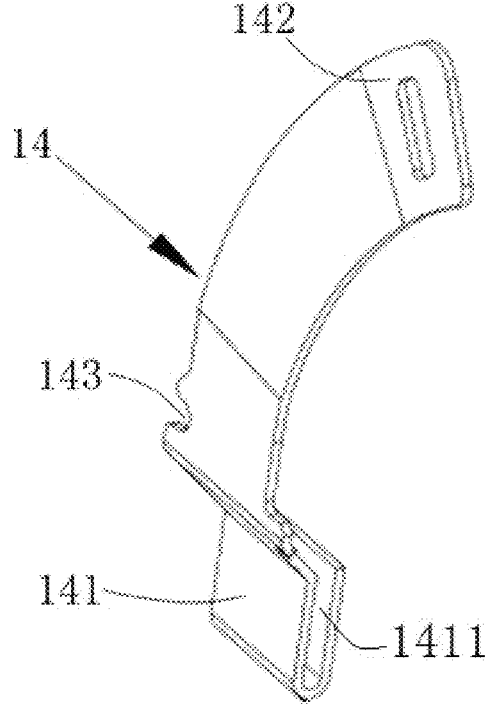
FIG. 6 is a schematic structural diagram of an electrode connector.
Figure 7:
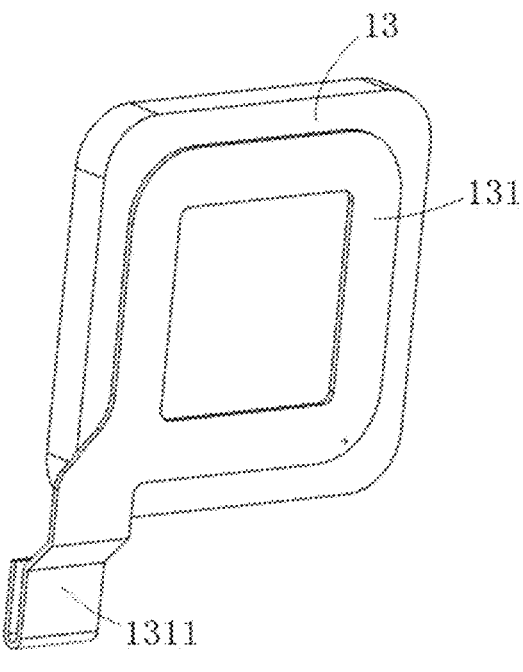
FIG. 7 is a schematic structural diagram of a pressure-sensitive resistor viewed from one side.
Figure 8:
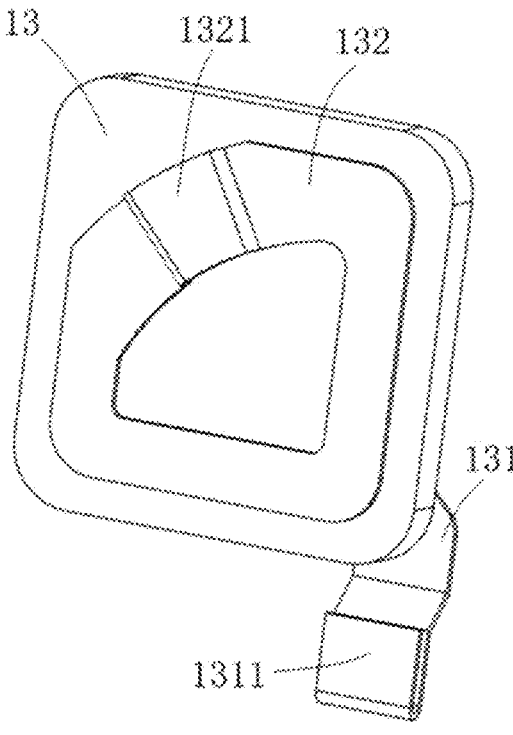
FIG. 8 is a schematic structural diagram of a pressure-sensitive resistor viewed from the other side.

In a preferred implementation, a specific structure of a bearing frame 12 is as shown in FIG. 3 and FIG. 4, a structure of a rotating body 15 is as shown in FIG. 5, a structure of an electrode connector 14 is as shown in FIG. 6, and a structure of a pressure-sensitive resistor 13 is as shown in FIG. 7 and FIG. 8.

Figure 9:
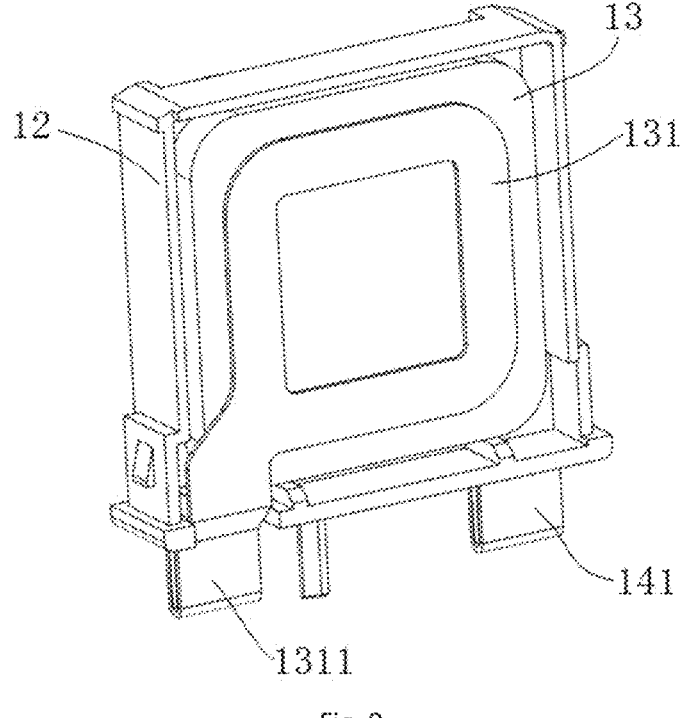
FIG. 9 is a schematic structural diagram of a pressure-sensitive resistor mounted on a bearing frame.

FIG. 3 shows a first side of the bearing frame 12, and FIG. 4 shows a second side of the bearing frame 12. FIG. 9 shows a state of the pressure-sensitive resistor 13 mounted on the first side of the bearing frame 12.

A first electrode 131 is arranged on one side of the pressure-sensitive resistor 13, and the first electrode 131 extends itself to form a first pin 1311. A second electrode 132 is arranged on the other side of the pressure-sensitive resistor 13, the second electrode 132 is mounted towards a mounting plate 121, and a boss 1321 protruding towards an electrode via hole 1211 is formed on the second electrode 132.

An electrode connector 14 is mounted on a second side of the bearing frame 12, one end of the electrode connector 14 forms a welding end 142 for being welded to the second electrode 132, and the welding end 142 is in a sheet shape, and is attached and welded to a surface of the boss 1321 of the second electrode 132 at the electrode via hole 1211. Through a mode of attaching and welding, a thickness of the welding position may be small, which is conducive to reducing a thickness of the surge protection module. The other end of the electrode connector 14 forms a second pin 141 used for plugging. An open hole is formed in the welding end 142 of the electrode connector 14, which is conducive to storing a solder during welding.

In order to position the electrode connector 14 relative to the bearing frame 12, a positioning column 125 is arranged on one of the electrode connector 14 and the bearing frame 12, and a positioning groove 143 matched with the positioning column 125 for positioning is formed in the other of the electrode connector 14 and the bearing frame 12. In this implementation, the positioning column 125 is arranged on the bearing frame 12, the positioning groove 143 is formed in the electrode connector 14, after the electrode connector 14 is welded to the pressure-sensitive resistor 13, the electrode connector 14 is positioned on the bearing frame 12 through the matching between the positioning groove 143 and the positioning column 125.

In this implementation, the first pin 1311 extends from the sheet-like first electrode 131 and is formed by bending, and the first electrode 131 is made of an elastic plate material, so that the first pin 1311 has a certain elasticity relative to the bearing frame 12 for convenient plugging. Similarly, as shown in FIG. 6, the second pin 141 of the electrode connector 14 also extends at one end of the sheet-like electrode connector 14 and is formed by bending, and the second pin 141 also has a certain elasticity relative to the bearing frame 12, which is convenient for plugging.

Preferably, the first pin 1311 and the second pin 141 are bent in a direction facing away from a tail end of a terminal respectively to form slots (referring to a slot 1411 formed by the second pin 141 in FIG. 6), a first supporting body 127 and a second supporting body 128 are arranged on the bearing frame 12 (referring to FIG. 3), the first supporting body 127 is plugged into the slot of the first pin 1311, and the second supporting body 128 is plugged into the slot of the second pin 141, so as to increase stability when the first pin 1311 and the second pin 141 are plugged respectively.

On the second side of the bearing frame 12, as shown in FIG. 3, a rotating shaft 122 is arranged on the mounting plate 121, and the rotating shaft 122 is closer to a bottom end of the bearing frame 12 compared to the electrode via hole 1211. In the present application, the end of the bearing frame 12 having the first pin 1311 and the second pin 141 is referred to as the bottom end, and the opposite end is referred to as a top end.

A rotating shaft mounting hole 153 is formed in the rotating body 15, the rotating body 15 is rotatably mounted on the rotating shaft 122 through the rotating shaft mounting hole 153, an arc-isolating plate 154 is arranged at a position of the rotating body 15 away from the rotating shaft 122, and the arc-isolating plate 154 is located on one side of the rotating body 15 facing away from the bottom end of the bearing frame 12. In this way, when the rotating body 15 is limited in a first position close to the bottom end of the bearing frame 12, the arc-isolating plate 154 is located on one side facing the electrode via hole 1211 and arranged corresponding to the electrode via hole 1211. Therefore, during welding and melting, the arc-isolating plate 154 may quickly rotate to the electrode via hole 1211 to block the possible solder adhesion of the welding between the electrode connector 14 and the second electrode 132.

Since the arc-isolating plate 154 rotates along an arc, preferably, the arc-isolating plate 154 has an inner arc edge 1541 bent towards the rotating shaft 122 and an outer arc edge 1542 away from the rotating shaft 122 compared to the inner arc edge 1541, that is, the arc-isolation plate 154 is roughly in a sector shape.

Preferably, an arc limiting groove is formed in the rotating body 15, the electrode connector 14 includes an arc part located in the arc limiting groove, and in a rotation process of the rotating body 15, the arc part moves rotates along the arc limiting groove; and two side edges of the arc limiting groove are formed by extending from the inner arc edge 1541 and the outer arc edge 1542 of the arc-isolating plate 154 respectively.

A second state indication part 152 (further detailed below) extending along the arc is formed at a position of the arc-isolating plate 154 close to the outer arc edge 1542, an arc strip 157 extending along the arc is formed at a position close to the inner arc edge 1541, in this way, as shown in FIG. 1, when the rotating body 15 is located at the first position, a welding point between the electrode connector 14 and the second electrode 132 is located between the arc strip 157 and the second state indication part 152, the arc-isolating plate 154 is located on one side of the welding point, during welding and melting, the arc-isolating plate directly rotates to cut between the electrode connector 14 and the second electrode 132, and the arc strip 157, the second state indication part 152 and the two side edges of the arc-isolating plate 154 are all conducive to completely blocking the possible arc between the electrode connector 14 and the second electrode 132.

In this implementation, the potential storage spring 16 is located on one side of the rotating body 15 facing away from the bottom end of the bearing frame 12, and when the electrode connector 14 and the second electrode 132 are in a welding state, the potential storage spring 16 is in a stretched state, so as to apply a tensile force to the rotating body 15. When the rotating body 15 rotates in a direction away from the bottom end of the bearing frame, the potential storage spring retracts.

Further, an accommodating groove 155 used for accommodating the potential storage spring 16 is formed in a position of the rotating body 15 between the rotating shaft 122 and the arc-isolating plate 154, a first spring connection part 123 is arranged on the bearing frame 12, a second spring connection part 156 is arranged at a position of the rotating body 15 close to the accommodating groove 155, one end of the potential storage spring 16 is connected to the first spring connection part 123, the other end is connected to the second spring connection part 156, and a part of the potential storage spring 16 close to the second spring connection part 156 is located in the accommodating groove 155. The accommodating groove 155 limits the potential storage spring 16 to be bent towards the rotating shaft 122, in this way, when the rotating body 15 rotates, the potential storage spring 16 stretches and retracts along an arc path.

Figure 10:
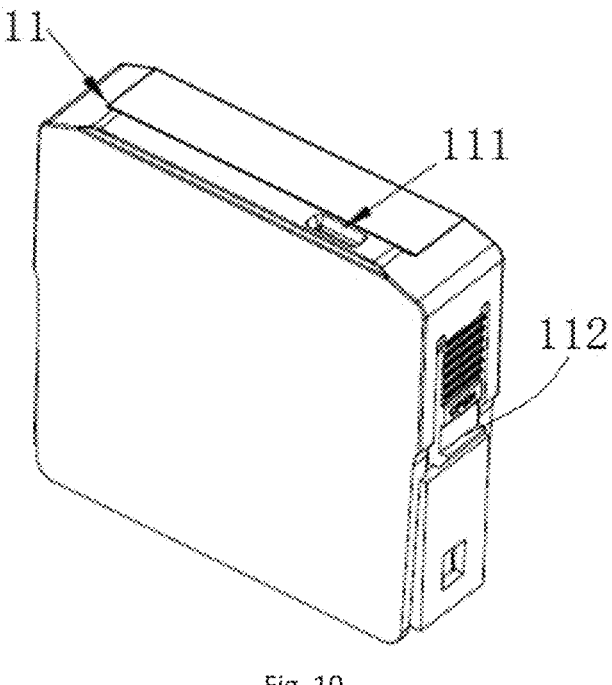
FIG. 10 is a schematic structural diagram of a surge protection module viewed from an outer side of a housing.

In this implementation, the surge protection module 1 further includes a housing 11, as shown in FIG. 1 and FIG. 2 (combined with FIG. 10), and a state display hole 111 is formed in the housing 111;

The first state indication part 124 is arranged on the bearing frame 12, and when the rotating body 15 is located at the first position, the state display hole 111 displays the first state indication part 124, indicating that the surge protection module is in a normal working state; and the second state indication part 152 is arranged on the rotating body 15, and when the rotating body 15 rotates to the second position, the state display hole 111 displays the second state indication part 152, indicating that the surge protection module is in a failed state.

Specifically, the second state indication part 152 is arranged on an outer side of the arc-isolating plate 154 in a radial direction (a radial direction centered on the rotating shaft 122), and the second state indication part 152 extends out of the arc-isolating plate 154 along the arc to form the arc strip bent towards the rotating shaft 122.

A gap exists between the first state indication part 124 and the state display hole 111, when the rotating body 15 rotates to the second position, the second state indication part 152 rotates to enter the gap and corresponds to the state display hole 111, and therefore, the state display hole 111 displays the second state indication part 152.

Figure 11:
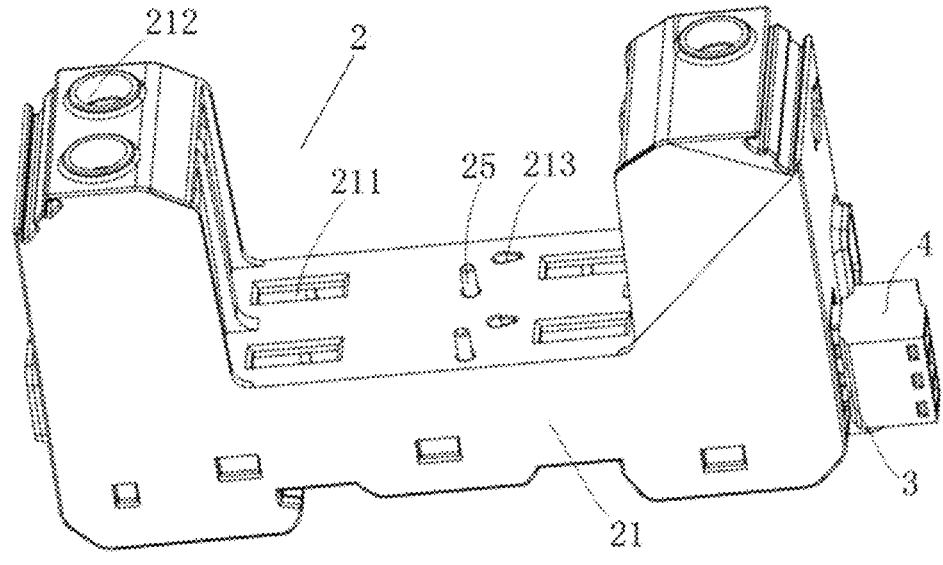
FIG. 11 is a schematic structural diagram of a base.
Figure 12:
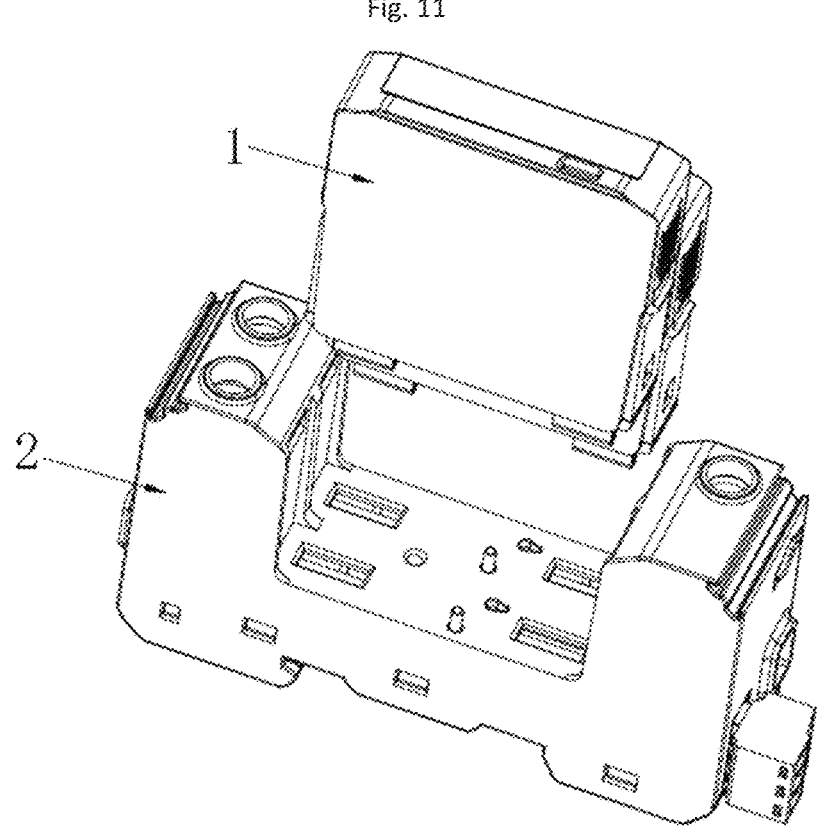
FIG. 12 is a schematic diagram of a surge protection module plugged with a base.

According to another aspect of the present disclosure, a surge protection device is further provided, as shown in FIG. 11 and FIG. 12, the surge protection device includes a base 2 and the surge protection module 1, mounted on the base 2, as mentioned above;

the base 2 is provided with bayonet sockets corresponding to a first pin 1311 and a second pin 141 respectively and used for being electrically connected with lines, and the first pin 1311 and the second pin 141 of the surge protection module 1 are correspondingly plugged into the bayonet sockets; and the base 2 is further provided with a remote signaling mechanism, which is arranged to be linked with a tripping mechanism, when a rotating body 15 is located at a first position, the remote signaling mechanism indicates a first state signal, and when the rotating body 15 is located at a second position, the remote signaling mechanism indicates a second state signal.

Specifically, one surge protection module 1 or at least two side-by-side surge protection modules 1 may be mounted on the base 2.

In one implementation, two surge protection modules 1 are mounted on the base 2, as shown in FIG. 12, the two surge protection modules 1 may be mounted on the base 2 in a clamping mode respectively, specifically, as shown in FIG. 11, buckles 112 are respectively arranged on two sides of a housing 11 of each surge protection module 1, clamping structures corresponding to the buckles 112 are arranged on the base 2, and each surge protection module 1 is fixed together with the base 2 through clamping.

In order to prevent the first pin 1311 and the second pin 141 from being misaligned when the surge protection module 1 is mounted on the base 2, an error-proofing pin 129 is arranged on the bearing frame 12 of the surge protection module 1, and the error-proofing pin 129 is correspondingly plugged into an error-proofing jack 213 of the base 2, which may prevent the surge protection module 1 from being mounted incorrectly on the base 2.

Figures 13, 14:
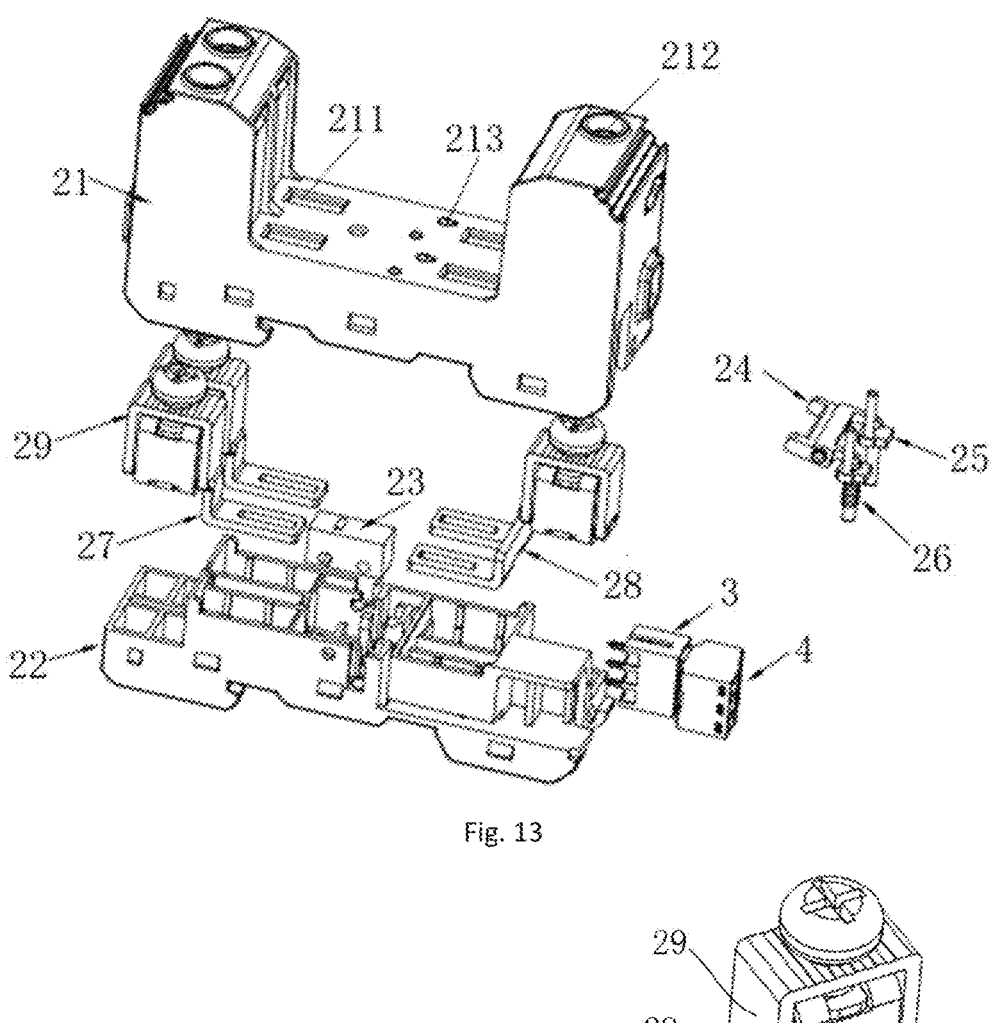
FIG. 13 is a schematic structural diagram of a base being in a separated state.
FIG. 14 is a schematic structural diagram of a remote signaling mechanism mounted in a base.

FIG. 13 shows a structure of the base 2 in a disassembled state, the base 2 includes a mounting main body 22 and an upper cover 21 covering the mounting main body 22, and the upper cover 21 may be fixed on the mounting main body 22 in clamping or other modes. A first wiring plate 27 and a second wiring plate 28 are mounted on the mounting main body 22, a limiting groove may be formed in the mounting main body 22 to limit the first wiring plate 27 and the second wiring plate 28 jacks for plugging with the first pin 1311 and the second pin 141 are formed in the first wiring plate 27 and the second wiring plate 28 respectively, open holes 211 corresponding to the jacks in the first wiring plate 27 and the second wiring plate 28 are formed in the upper cover 21, the jacks in the first wiring plate 27 and the second wiring plate 28 and the corresponding open holes 211 in the upper cover 21 form bayonet sockets for plugging of the first pin 1311 and the second pin 141, the first wiring plate 27 and the second wiring plate 28 are electrically connected with lines through a crimping frame 29 and a bolt arranged thereupon respectively, and the lines specifically may be electrically connected with the first wiring plate 27 and the second wiring plate 28 through a wiring hole 212 above the base 2.

Figure 15:
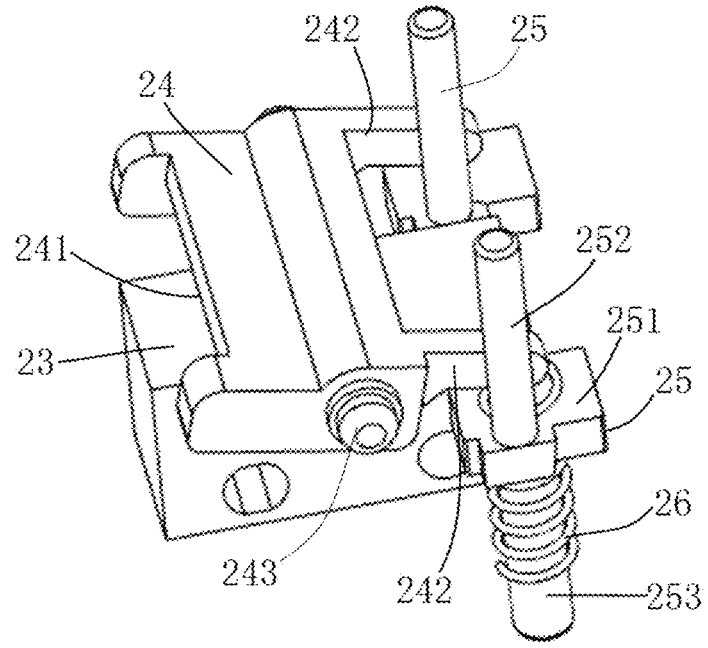
FIG. 15 is a schematic structural diagram of a remote signaling mechanism.

In this implementation, as shown in FIG. 13 to FIG. 15, the remote signaling mechanism includes a microswitch 23, a linkage swing rod 24, a transmission piece 25 arranged corresponding to each surge protection module 1 and springs 26 arranged between each transmission piece 25 and the base 2.

The microswitch 23 is fixedly mounted on the base 2, the linkage swing rod 24 is rotatably mounted on the base 2 (the microswitch 23 and the linkage swing rod 24 are specifically mounted on the mounting main body 22 of the base 2), and the linkage swing rod 24 includes a touching part 241 used for touching a button of the microswitch 23 and a force bearing part 242 arranged corresponding to each transmission piece 25.

A limiting surface 151 is formed on one side of the rotating body 15 facing the bottom end of the bearing frame 12, when the rotating body 15 is located at the first position, the limiting surface 151 of the rotating body 15 is pressed on the transmission pieces 25, so that the transmission pieces 25 are in a compressed state, the springs 26 are compressed between the transmission pieces 25 and the base 2, and the microswitch 23 sends the first state signal, indicating that the surge protection device is in a normal state. When the rotating body 15 rotates to the second position, the transmission pieces 25 are broken away from the pressure of the rotating body 15, the transmission pieces 25 move under an elastic force of the springs 26, the transmission pieces 25 push the corresponding force bearing parts 242 to cause the linkage swing rod 24 to rotate, when the touching part 241 rotates, the button of the microswitch 23 is touched, and the microswitch 23 sends the second state signal to indicate that the surge protection device is in a failed state.

Preferably, a remote signaling terminal seat 3 and a remote signaling connection terminal 4 connected to the remote signaling terminal seat 3 may be arranged on the base 2, and the remote signaling terminal seat 3 is connected to the microswitch 23 to perform remote transmission on the signals indicated by the microswitch 23 through the remote signaling terminal seat 3 and the remote signaling connection terminal 4.

Specifically, as shown in FIG. 25, each transmission piece 25 in this implementation includes:

an intermediate part 251, arranged to be used for pushing the force bearing parts 242 of the linkage swing rod 24;

a first column body 252, located on one side of the intermediate part 251, and used for being linked with a tripping mechanism; and a second column body 253, arranged on the other side of the intermediate part 251, wherein each spring 26 sleeves the corresponding second column body 253, one end of each spring 26 abuts against the intermediate part 251, and the other end abuts against the mounting main body 22.

When the rotating body 15 is located at the first position, the limiting surface 151 of the rotating body 15 applies pressure on each first column body 252, so that each spring 26 is in a compressed state; and when the rotating body 15 is located at the second position, each first column body 252 is broken away from the pressure of the rotating body 15, each spring 26 drives each transmission piece 25 to move to cause the intermediate part 251 to push the force bearing parts 242 of the linkage swing rod 24, and the linkage swing rod 24 rotates and presses the microswitch 23.

Figure 18:
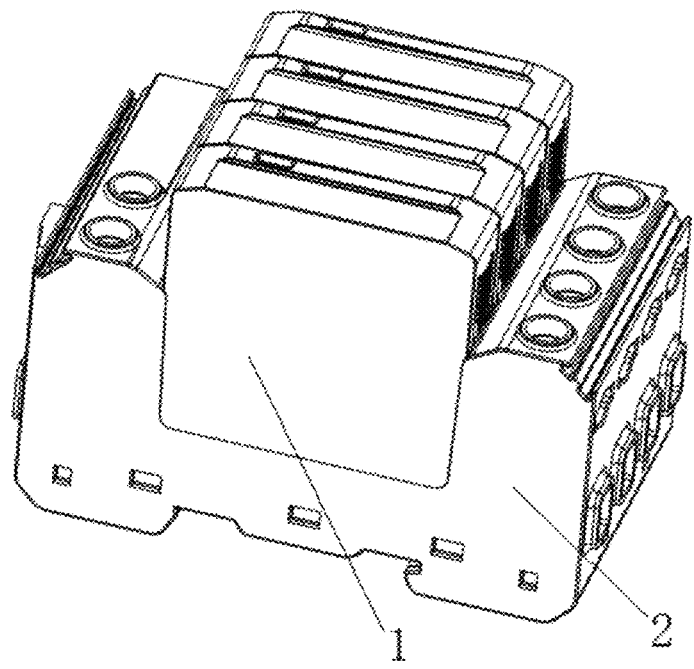
FIG. 18 is a schematic diagram of a surge protection device with four surge protection modules mounted on a base.
Figure 19:
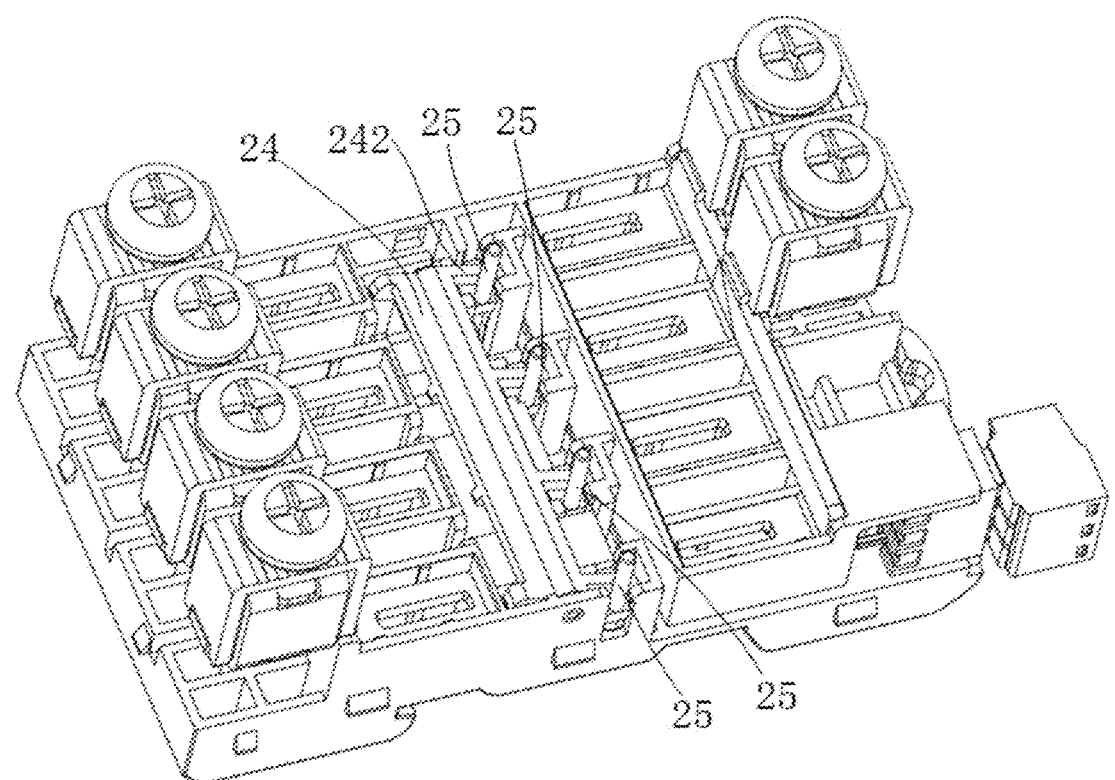
FIG. 19 is a schematic structural diagram of mounting of a remote signaling mechanism corresponding to four surge protection modules and mounted on a base.

FIG. 18 shows that four surge protection modules 1 are mounted on the base 2, and FIG. 19 shows that the linkage swing rod 24 and the transmission pieces 25 corresponding to the four surge protection modules 1 are mounted on the mounting main body 22 of the base 2, and the force bearing parts 242 corresponding to the four transmission pieces 25 respectively are arranged on the linkage swing rod 24.

In the surge protection device provided by the present disclosure, if any one of the surge protection modules 1 fails, the linkage swing rod 24 may touch the microswitch 23, thereby sending a signal of failure of the surge protection device.

A specific working process of the surge protection device in this implementation is described below.

Figure 16:
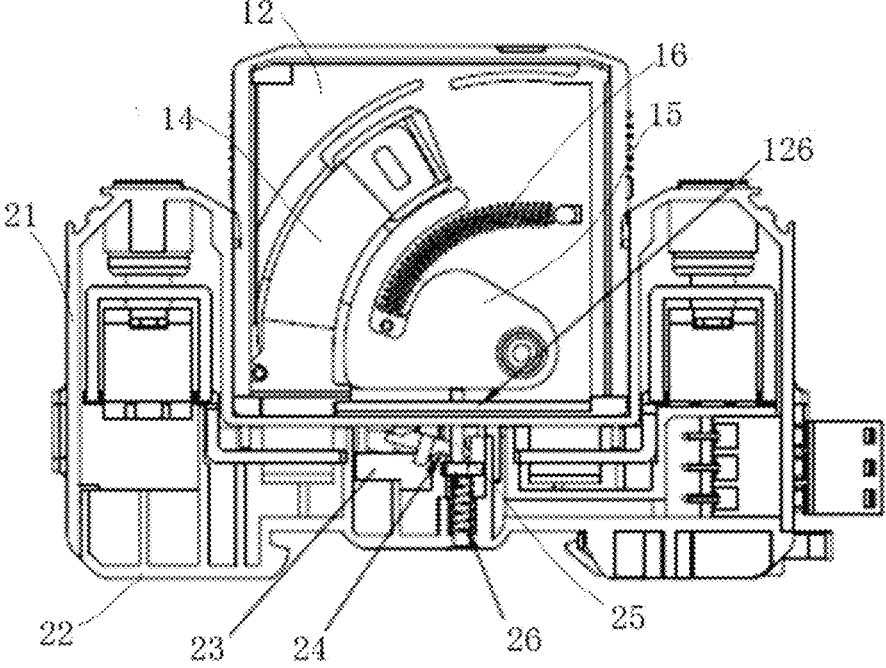
FIG. 16 is a schematic cross-sectional view of a surge protection device (being in a normal working state).
Figure 17:
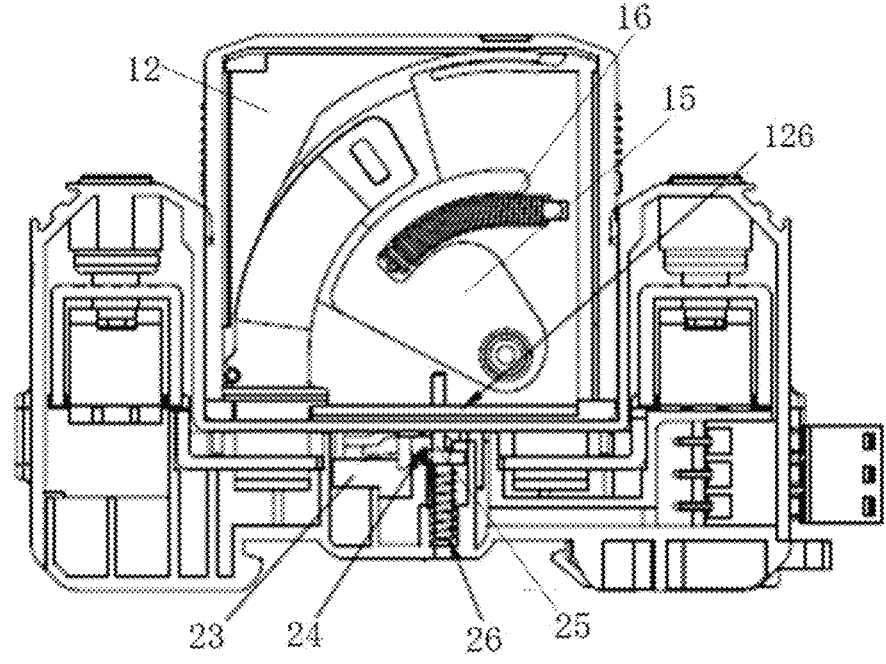
FIG. 17 is a schematic cross-sectional view of a surge protection device (being in a failed state).

As shown in FIG. 16 and FIG. 17, when the remote signaling mechanism is mounted on the base 2, the first column bodies 252 of the transmission pieces 25 penetrate through the upper cover 21 of the base 2 and via holes 126 in the bearing frame 12 in the surge protection module 1.

When the electrode connector 14 and the second electrode 132 of the pressure-sensitive resistor 13 are in a welding state, the rotating body 15 is located at the first position, a state as shown in FIG. 16, at this time, the limiting surface 151 of the rotating body 15 is pressed on the first column bodies 252 of the transmission pieces 25, the springs 26 are in a retraction state under the pressure of the transmission pieces 25, the transmission pieces 25 do not apply a force to the linkage swing rod 24, and the microswitch 23 is not pressed by the linkage swing rod 24, so that the microswitch 23 indicates that the surge protection device is in the normal working state. When faults such as deterioration or short circuit occur in the pressure-sensitive resistor 13, the temperature increases, and a solder between the electrode connector 14 and the second electrode 132 of the pressure-sensitive resistor 13 melts, the rotating body 15 rotates to the second position, as shown in FIG. 17, the first column bodies 252 are broken away from the limitation of the limiting surface 151 of the rotating body 15, the transmission pieces 25 move upwards under the elastic force of the springs 26, in the process of upward movement, the intermediate parts 251 on the transmission pieces 25 push the corresponding force bearing parts 242 on the linkage swing rod 24, so that the linkage swing rod 24 rotates, the rotation of the linkage swing rod 24 may cause the touching part 241 to press a switch on the microswitch 23 and change a state of the microswitch 23, indicating that the surge protection device is in the failed state, and the indication signal is remotely transmitted through the remote signaling terminal seat 3 and the remote signaling connection terminal 4 connected to the remote signaling terminal seat 3, so as to remind maintenance personnel to replace the failed surge protection module 1 timely.

The preferred implementations of the present disclosure are described in details above in conjunction with the accompanying drawings, but the present disclosure is not limited to this. Within the scope of the technical concept of the present disclosure, various simple modifications may be made to the technical solution of the present disclosure, including combinations of various specific technical features in any suitable way. In order to avoid unnecessary repetition, various possible combination methods will not be described separately in the present disclosure. However, these simple modifications and combinations should also be considered as disclosed content of the present disclosure, all of which fall within the scope of protection of the present disclosure.

What is claimed is:

1. A surge protection module, comprising:

a bearing frame, comprising a mounting plate which is provided with an electrode via hole penetrating through both sides;

a pressure-sensitive resistor, mounted on a first side of the mounting plate and having a first electrode and a second electrode, the first electrode being provided with a first pin located at a bottom end of the bearing frame and used for plugging;

an electrode connector, mounted on a second side of the mounting plate, one end of the electrode connector being welded to the second electrode of the pressure-sensitive resistor through the electrode via hole, and the other end of the electrode connector being provided with a second pin located at the bottom end of the bearing frame and used for plugging; and a tripping mechanism, comprising a rotating body and a potential storage spring, one end of the rotating body being rotatably mounted on the second side of the mounting plate through a rotating shaft, and an arc-isolating plate being arranged at a position of the rotating body away from the rotating shaft, wherein the arc-isolating plate has an inner arc edge bent towards the rotating shaft and an outer arc edge away from the rotating shaft compared to the inner arc edge; wherein when the electrode connector and the second electrode are in a welding state, the rotating body is limited in a first position close to the bottom end of the bearing frame, the arc-isolating plate is located on one side of the rotating body facing the electrode via hole and corresponds to the electrode via hole, and the potential storage spring is arranged between the rotating body and the bearing frame and is in a compressed or stretched potential storage state; and when a solder between the electrode connector and the second electrode melts, the potential storage spring drives the rotating body to rotate to a second position in a direction away from the bottom end of the bearing frame through an elastic force, and at the second position, the arc-isolating plate rotates to the electrode via hole and between the electrode connector and the second electrode.

2. The surge protection module according to claim 1, wherein the potential storage spring is located on one side of the rotating body facing away from the bottom end of the bearing frame, when the electrode connector and the second electrode are in the welding state, the potential storage spring is in a stretched state, and when the rotating body rotates in the direction away from the bottom end of the bearing frame, the potential storage spring retracts.

3. The surge protection module according to claim 2, wherein a position between the rotating shaft and the arc-isolating plate is provided with an accommodating groove used for accommodating the potential storage spring, a first spring connection part is arranged on the bearing frame, and a second spring connection part is arranged at a position of the rotating body close to the accommodating groove; and one end of the potential storage spring is connected to the first spring connection part, the other end is connected to the second spring connection part, a part of the potential storage spring close to the second spring connection part is located in the accommodating groove, and the accommodating groove limits the potential storage spring to bend towards the rotating shaft.

4. The surge protection module according to claim 1, further comprising a housing, wherein a state display hole is formed in a top end of the housing;

a first state indication part is arranged on the bearing frame, and when the rotating body is located at the first position, the state display hole displays the first state indication part; and a second state indication part is arranged on the rotating body, and when the rotating body rotates to the second position, the state display hole displays the second state indication part.

5. The surge protection module according to claim 4, wherein the second state indication part is arranged on an outer side of the arc-isolating plate in a radial direction, and the second state indication part extends out of the arc-isolating plate along an arc to form an arc strip bent towards the rotating shaft; and a gap exists between the first state indication part and the state display hole, and when the rotating body rotates to the second position, the second state indication part rotates to enter the gap and corresponds to the state display hole.

6. The surge protection module according to claim 1, wherein an arc limiting groove is formed in the rotating body, the electrode connector comprises an arc part located in the arc limiting groove, and in a rotation process of the rotating body, the arc part moves relative to the rotating body along the arc limiting groove; and two side edges of the arc limiting groove are formed by extending from the inner arc edge and the outer arc edge of the arc-isolating plate respectively.

7. The surge protection module according to any one of claims 1 to 5, wherein a boss protruding towards the electrode via hole is formed on the second electrode of the pressure-sensitive resistor, one end of the electrode connector welded to the pressure-sensitive resistor is a sheet-like body, and the sheet-like body is attached and welded to a surface of the boss through the electrode via hole.

8. A surge protection device, comprising a base and the surge protection module, mounted on the base, according to any one of claims 1 to 5 and 6, wherein the base is provided with bayonet sockets corresponding to a first pin and a second pin respectively and used for being electrically connected with lines, and the first pin and the second pin of the surge protection module are correspondingly plugged into the bayonet sockets; and the base is further provided with a remote signaling mechanism, which is arranged to be linked with a tripping mechanism, when a rotating body is located at a first position, the remote signaling mechanism indicates a first state signal, and when the rotating body is located at a second position, the remote signaling mechanism indicates a second state signal.

\* \* \* \* \*